July 5, 1960 — A. M. ROSOFF — 2,943,600
FEED CONTAINER-DISPENSER
Filed July 10, 1957

Inventor
ARTHUR M. ROSOFF
by Fred'k H. Schuetz
Attorney

United States Patent Office 2,943,600
Patented July 5, 1960

2,943,600

FEED CONTAINER-DISPENSER

Arthur M. Rosoff, 8 Silver St., Elmont, N.Y.

Filed July 10, 1957, Ser. No. 671,022

1 Claim. (Cl. 119—18)

The invention relates to a sealed container or package for feed and the like, particularly bird seed or grain, and modified to provide a self-feeder thereof in dispensing such seed or grain automatically. The said container is readily attachable to a bird cage, for example, and has associated therewith means whereby the contents may automatically be dispensed as consumed, said means initially completely sealing the container but being manually operable to expose and dispense the contents for consumption.

It is an object of the invention to provide a bird owner with a feed package conveniently attachable to a bird cage and equipped with readily installable means serving not only to seal the contents of said package but being also slidable outwardly with respect thereto for dispensing of the said contents and the automatic feeding thereof, thereby eliminating daily manual supply of the feed.

Another object of the invention is to provide a novel and relatively inexpensive feeding trough which is readily applicable to packages designed for the retention of bird feed and the like.

In carrying out the invention, a feeding trough is provided for association with a package of feed by mounting the same slidably through an opening at the bottom of its front wall. This trough is in the nature of an elongated dish open at the back and having side walls which are flexible, the bottom of the dish extending an appreciable distance beyond the respective vertical inner edges of the said side walls. The latter are provided with respective ears which are turned outwardly from said vertical edges at their upper portions to afford stops preventing complete withdrawal normally of the dish when mounted in a container.

At its front wall lips extend upwardly and downwardly respectively to act as stops to limit the extent of insertion of the dish into a container, through contact with the front wall thereof. Additional stops are provided on the respective side walls and are displaced vertically with respect to the ears thereof.

The nature of the invention, however, will best be understood when described in connection with the accompanying drawings, in which.

Figure 1:
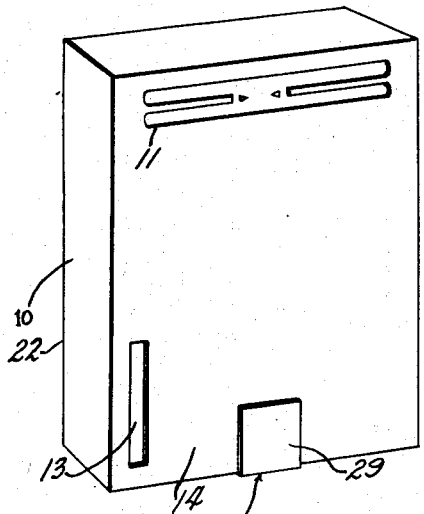
Fig. 1 is a perspective view of the feed container showing the dispenser installed, with the latter sealing said container.
Figure 2:
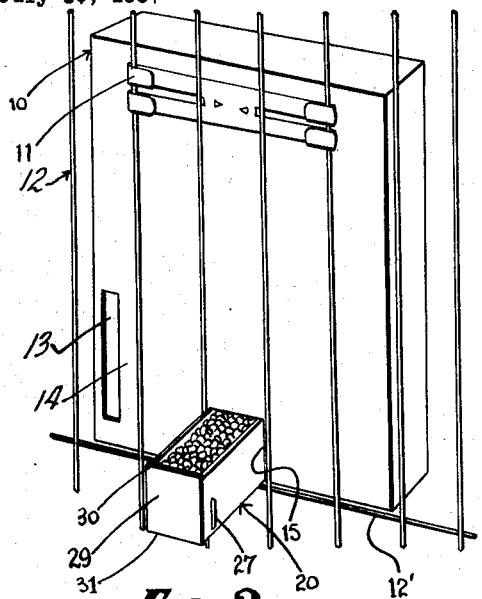
Fig. 2 is a perspective view illustrating the manner of attachment of the same to a bird cage, the dispenser being shown in the feeding position.

Referring to the drawings, more particularly Figs. 1 and 2 thereof, 10 designates a container for packaging bird seed and the like which will flow freely, said container being generally constructed of cardboard or more or less flexible material; and, in accordance with the invention, the same is provided with a soft metal clamping means 11 whereby the container may be attached removably to the vertical bars of a bird cage 12, as is indicated. A sight opening 13 may be provided at the lower portion of the front wall 14 of the container to indicate the exhaustion of the feed.

Figure 3:
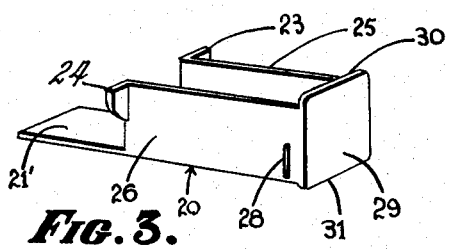
Fig. 3 is a perspective view of the feeding trough.
Figure 4:
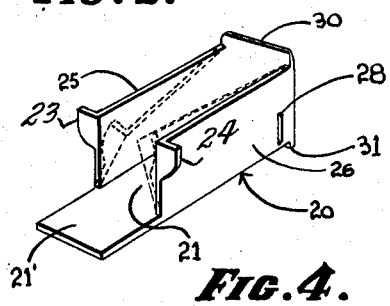
Fig. 4 is a similar view illustrating the side walls thereof brought somewhat together to enable installation initially of the trough in the container.
Figure 5:
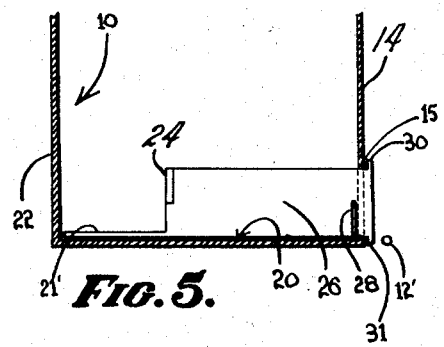
Figs. 5 and 6 are fragmentary vertical sections through the lower portion of the container (at its dispensing opening) and illustrate respectively the sealing position of the trough and its extended feeding position.

In addition, the front wall 14 is provided at the extreme bottom with a further opening 15 designed to receive slidably the dispensing means 20, which serves also as a seal for the packaged seed. This dispensing means is in the nature of a trough or dish fully open at its inner end, as is indicated more clearly in Figs. 3 and 4. The bottom 21 thereof is, moreover, extended rearwardly a distance, as is indicated at 21', such that when the dish is fully inserted into container 10, as will hereinafter be more fully set forth, it extends substantially to the rear wall 22 of said container. However, when the dish is in its operative extended position, Fig. 6, and resting on horizontal cage bar 12', said extension 21' serves to prevent upward tilting and outward movement of the extended dish, which would otherwise occur due to the fulcrum action on bar 12', because of seed weight in container 10 (indicated by the arrows, Fig. 6).

Figure 6:
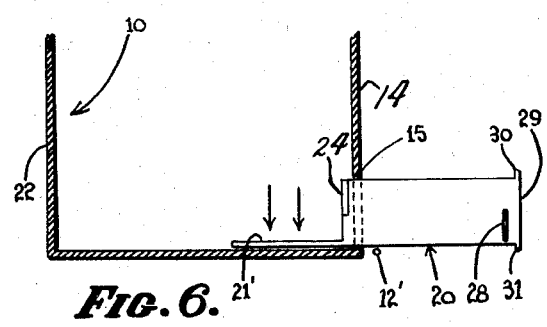

In order to limit such withdrawal of the dish, outwardly extending ears 23, 24 are provided on the respective side walls 25, 26 at their upper edges, which ears will then abut the inner surface of the front wall 14 when dish 20 is brought outwardly as is indicated in Figs. 2 and 6. Walls 25, 26, moreover, are to be more or less flexible in order that the dish may initially be insertable into the container through the front wall aperture 15— said walls to this end being temporarily squeezed toward each other as is indicated by the dotted line positions, Fig. 4 of the drawings.

Additional stop means 27, 28 at the forward ends of said side walls may be provided to retain the dish in its inoperative location, the container material being somewhat yieldable to pass these stops initially when installing the dish through the aperture 15.

To limit the extent of insertion of the dish 20 into the container 10, the front wall 29 of said dish may be extended upwardly as a lip 30, as well as downwardly to provide a lip 31, both of which will then engage the outer surface of front wall 14 when the dish is fully inserted.

I claim:

The combination with a sealed feed container adapted for attachment to a bird cage to serve automatically as a feeder, said container having an aperture in its front wall substantially at the bottom thereof; of a feeding trough therefor permanently retained by the container and comprising an open-top, open-back, elongated and flat-bottomed dish fitting through said aperture and slidable therein over the bottom of the container, said dish having flexible side walls and its bottom extending beyond the respective vertical edges of its side walls and, when the dish is fully inserted, substantially to the inner face of the wall opposite the front wall of said container, and respective ears integral with said side walls turned outwardly from said vertical edges at their upper portions to afford stops preventing complete withdrawal normally of the dish when mounted within the container, together with an upwardly directed manipulating lip extending from the top of the front wall of the dish and acting as a stop to limit the extent of insertion of the dish into the container by contact with the front wall thereof.

References Cited in the file of this patent

UNITED STATES PATENTS

| | | |
|---|---|---|
| 1,120,178 | Berghofer | Dec. 8, 1914 |
| 1,378,533 | Fitz Gerald | May 17, 1921 |
| 1,633,880 | Ahlrichs | June 28, 1927 |
| 2,699,752 | Reyes | Jan. 18, 1955 |
| 2,775,226 | Early | Dec. 25, 1956 |